United States Patent
Murakumo et al.

(10) Patent No.: US 7,071,472 B2
(45) Date of Patent: Jul. 4, 2006

(54) IRRADIATION CONTROL DEVICE

(75) Inventors: Masashi Murakumo, Yokohama (JP); Hiroaki Natori, Kawasaki (JP); Osamu Ikeda, Kawasaki (JP); Yutaka Maruta, Kawasaki (JP); Kunihiro Ikeda, Kawasaki (JP); Shinji Hidaka, Kawasaki (JP); Nobumasa Sasaki, Kawasaki (JP); Tamotsu Amamoto, Yokohama (JP); Hiroyuki Nakashima, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/127,983

(22) Filed: May 12, 2005

(65) Prior Publication Data

US 2005/0199815 A1  Sep. 15, 2005

Related U.S. Application Data

(63) Continuation of application No. PCT/JP03/04076, filed on Mar. 31, 2003.

(51) Int. Cl.
  *G01J 1/42* (2006.01)
  *G01J 5/00* (2006.01)
  *H01L 31/00* (2006.01)
  *H01L 25/00* (2006.01)

(52) U.S. Cl. ............... 250/354.1; 250/338.1; 250/330; 250/332

(58) Field of Classification Search ............ 250/354.1, 250/338.1, 330, 332
See application file for complete search history.

(56) References Cited

U.S. PATENT DOCUMENTS 6,336,023 B1 * 1/2002 Toyama et al. ............ 399/296
2002/0191102 A1 * 12/2002 Yuyama et al. ............ 348/370
2003/0156755 A1 * 8/2003 Watanabe et al. .......... 382/182

FOREIGN PATENT DOCUMENTS

| JP | 5-219447 | 8/1993 |
| JP | 10-261190 | 9/1998 |
| JP | 2000-306684 | 11/2000 |
| JP | 2000-338557 | 12/2000 |

OTHER PUBLICATIONS

International Search Report dated Jul. 22, 2003.

* cited by examiner

*Primary Examiner*—David Porta
*Assistant Examiner*—Mindy Vu
(74) *Attorney, Agent, or Firm*—Katten Muchin Rosenman LLP (57) ABSTRACT

In an irradiation control device which extends a longevity of an LED, a feedback control is performed to an irradiating portion by an output signal of a photo device provided in relation to the irradiating portion, thereby making brightness fixed. Alternatively, by performing image processing to an image taken by a camera, brightness on a screen is calculated, so that a feedback control is performed to the irradiating portion to make the brightness fixed. Alternatively, based on a recognition rate upon character recognition within the image taken by the camera, a feedback control is performed to the irradiating portion to make the brightness fixed.

12 Claims, 8 Drawing Sheets

PRIOR ART

FIG.11

IRRADIATION CONTROL DEVICE

CROSS-REFERENCE TO RELATED APPLICATION

This application is a continuation of International Application PCT/JP03/04076 filed on Mar. 31, 2003, pending at the time of filing of this continuation application, the contents of which are herein wholly incorporated by reference.

BACKGROUND OF THE INVENTION

1. Field of the Invention

The present invention relates to an irradiation control device, and in particular to an irradiation control device used for an imaging device or the like which monitors or takes an image of a person, a character or the like in the nighttime or in a dark place.

2. Description of the Related Art

In the nighttime or in a dark place, a person, a character or the like is recognized by monitoring same by using a camera with irradiation and processing the output image of the camera. In such a case, a system using near-infrared irradiation by an LED (light-emitting diode) for making the irradiation as unnoticeable as possible has been known.

Figure 10:
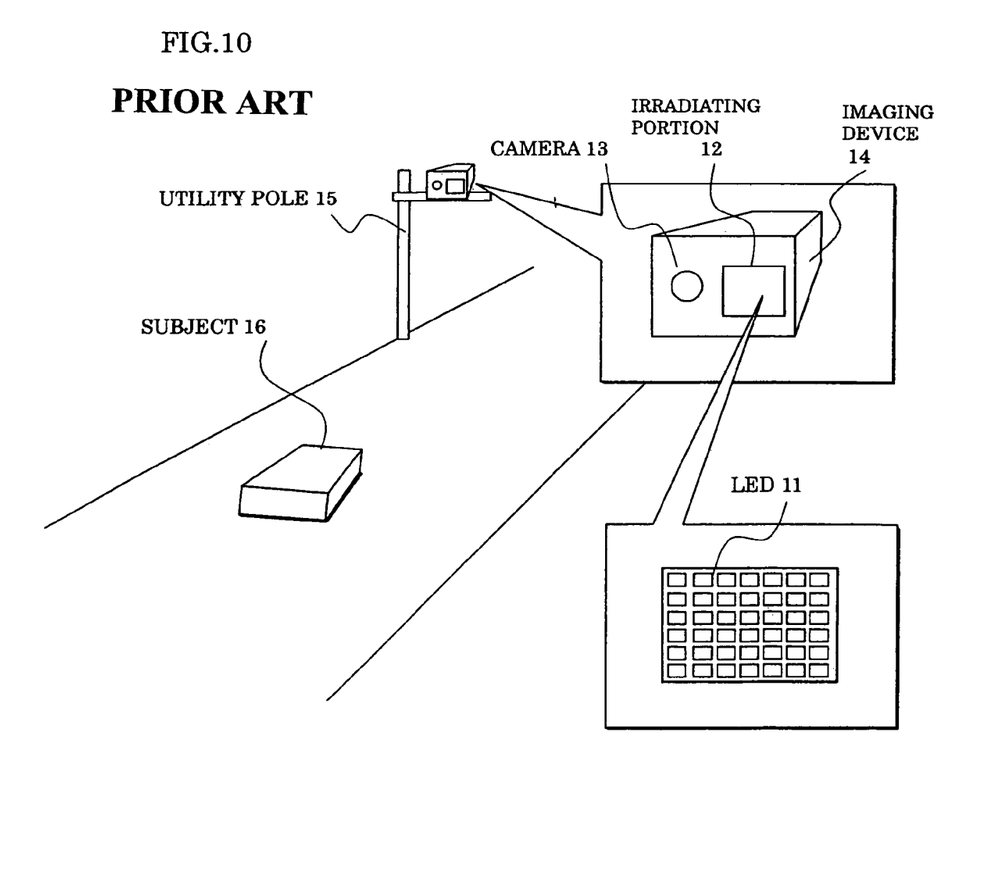
FIG. 10 is a schematic diagram of a prior art irradiation system.

FIG. 10 shows a schematic diagram of such a system, in which an imaging (image pick-up) device 14 composed of an irradiating portion 12 with an LED 11 and a camera 13 is placed on a utility pole 15 on a road shoulder. When taking an image of or photographing a subject such as a vehicle 16 on a road by the camera 13 of the imaging device 14, the LED 11 of the irradiating portion 12 is lighted so that the image of the subject 16 is acquired by the near-infrared rays.

At this time, a method of shortening a lighting time of the LED 11 as much as possible or the like has been adopted in order to extend the longevity of the LED 11 as long as possible.

Specifically, a lighting time control has been performed as follows:

(1) The LED is lighted at a shutter timing of the camera;
(2) Brightness or luminance of the image taken is detected by image processing, and only when it becomes dark to some extent, the LED 11 is lighted;
(3) Normally, the LED 11 is lighted darkly and a motion is detected by the image processing, so that when a motion change is detected, the output of the LED 11 is increased.

On the other hand, a TV camera irradiation device has been proposed having a semiconductor light emitting device irradiating a subject, and a light emitting time controller which activates the semiconductor light emitting device to emit for a predetermined time including an imaging time in response to an image timing signal from a CCD imaging TV camera and to intermit a light emitting body for a fixed time (see e.g. patent document 1).

Also, a vehicle number recognition device has been proposed which connects a shutter synchronous signal to an irradiation in order to synchronize with a shutter open time of a television camera, sets a pyroelectric sensor, and lights the irradiation only when a vehicle is detected farther than a view of the camera (see e.g. patent document 2).

Furthermore, an image monitoring device has been proposed which has an irradiation projecting control means lighting or extinguishing an irradiation device according to average luminance of an image obtained from a captured image of a monitoring area (see e.g. patent document 3).

<Patent Document 1>
Japanese Patent Application Laid-open No. 5-219447 (Abstract and FIG. 1).

<Patent Document 2>
Japanese Patent Application Laid-open No. 10-261190 (Abstract and FIG. 1).

<Patent Document 3>
Japanese Patent Application Laid-open No. 2000-306684 (Abstract and FIG. 1).

Figure 11:
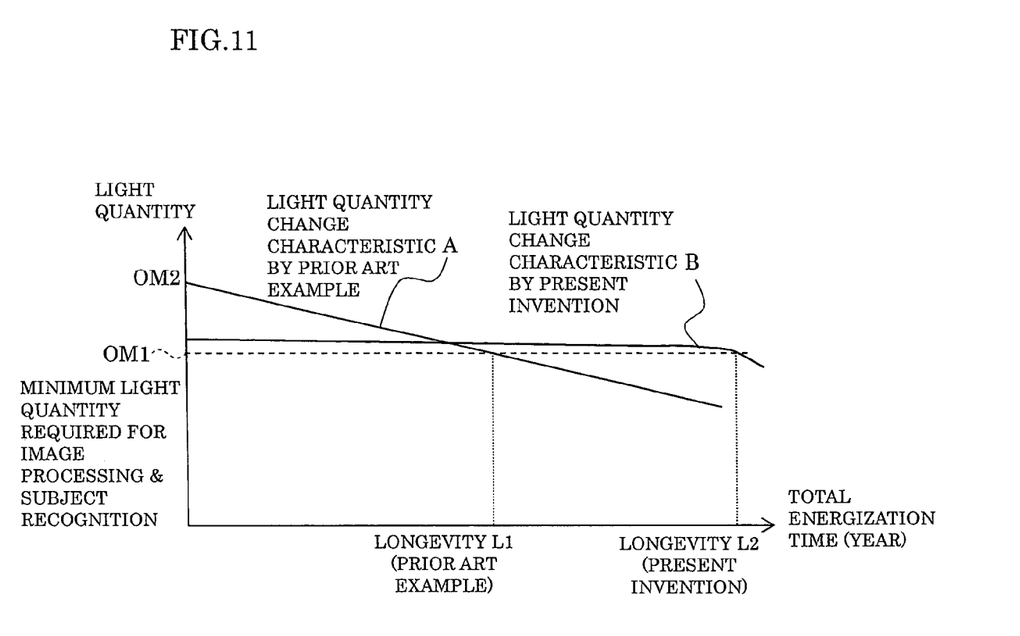
FIG. 11 is a graph showing a light quantity change characteristic of an LED by the prior art example and the present invention.

However, since an operating current control of the LED that is a light emitting device has not been performed in the prior art lighting control, as shown in a light quantity change characteristic A of the prior art example of FIG. 11, the emitting light quantity (ordinate) of the LED linearly attenuates for a total energization time (abscissa).

Accordingly, in order to secure at least a minimum light quantity OM1 required for image processing, a subject recognition or the like for a minimum longevity L1 (e.g. two years), an operating current which can provide a light quantity OM2 larger than the light quantity OM1 has to be flowed from the time when the LED was set or mounted.

In other words, it has been required to flow a large operating current from the time when the LED was set or mounted to emit the light quantity OM2, so that deterioration of the LED has been accelerated to shorten its longevity L1.

SUMMARY OF THE INVENTION

It is accordingly an object of the present invention to provide an irradiation control device which can extend a longevity of an LED.

In order to achieve the above-mentioned object, the present invention is performed by noticing a light quantity change characteristic B as shown in FIG. 11 such that if the fixed minimum light quantity OM1 required for image processing and a subject recognition, which is lower than the light quantity OM2 based on the light quantity change characteristic A by the prior art example is kept, a longevity L2 longer than the longevity L1 of the prior art LED can be obtained.

Thus, in order to keep the light quantity of the LED at a minimum fixed level required, it is necessary to detect a present light quantity to perform a feedback control to the light quantity.

Therefore, an irradiation control device according to the present invention comprises: an irradiating portion having an LED; a photo device receiving an output light of the LED; a light quantity measuring portion measuring a light quantity of the LED from an output signal of the photo device; and a controller controlling the irradiating portion in order that the light quantity achieves a predetermined minimum fixed level required for recognizing a subject.

Namely, an output light of an LED of an irradiating portion is received by a photo device, and a light quantity of the LED is detected from an output signal of the photo device by a light quantity measuring portion, so that a controller controls the irradiating portion in order that the light quantity detected achieves the above-mentioned minimum fixed level OM1 required.

Thus, in addition to a method that a control is performed to achieve the fixed LED light quantity by detecting the output light quantity of the LED with the photo device and performing the feedback control to the output light quantity by the light quantity measuring portion and the controller, a method that an image taken by a camera is processed, luminance on a screen is calculated and the feedback control is performed to achieve a fixed brightness for a subject is conceived.

Namely, an irradiation control device according to the present invention comprises: an irradiating portion having an LED; a camera taking an image of a subject irradiated by the irradiating portion; an image processor processing an output image from the camera and detecting luminance of the subject; and a controller controlling the irradiating portion in order that the luminance achieves a predetermined minimum fixed level required for recognizing an image of a subject.

In this case, an image of a subject irradiated by the irradiating portion is taken by a camera and the output image from the camera is processed by an image processor, thereby detecting luminance of an entire subject. The controller controls the irradiating portion in order that the luminance achieves the light quantity OM1 that is the minimum fixed level required for the image recognition of the subject as shown in FIG. 11.

It is to be noted that the above-mentioned image processor may detect a character label portion of the subject, thereby enabling the luminance thereof to be detected.

Also, the above-mentioned image processor may perform a character recognition of the character label portion and may detect a matching rate, not the luminance, with a reference character pattern, and the controller may control the irradiating portion in order that the matching rate achieves a predetermined minimum fixed level required for an image recognition of a subject.

Furthermore, the above-mentioned controller may control an operating current value of the LED, thereby enabling the light quantity of the LED to be controlled.

Furthermore, the above-mentioned controller may perform an alarm notification and may promote an exchange, since when the operating current value is increased to reach a current limit value thereof, it is considered that the LED has reached its longevity.

Furthermore, when the above-mentioned irradiating portion has a plurality of LEDs, the controller may control the number of LEDs lighted to achieve the predetermined minimum fixed level required for an image recognition of a subject, thereby enabling the light quantity of the LED to be controlled in the same way as the control of the operating current.

Also in this case, the controller may perform an alarm notification when determining that the fixed level can not be achieved even by increasing the number of LEDs lighted, since it is considered that the LED has reached its longevity.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Embodiment 1

Figure 1:
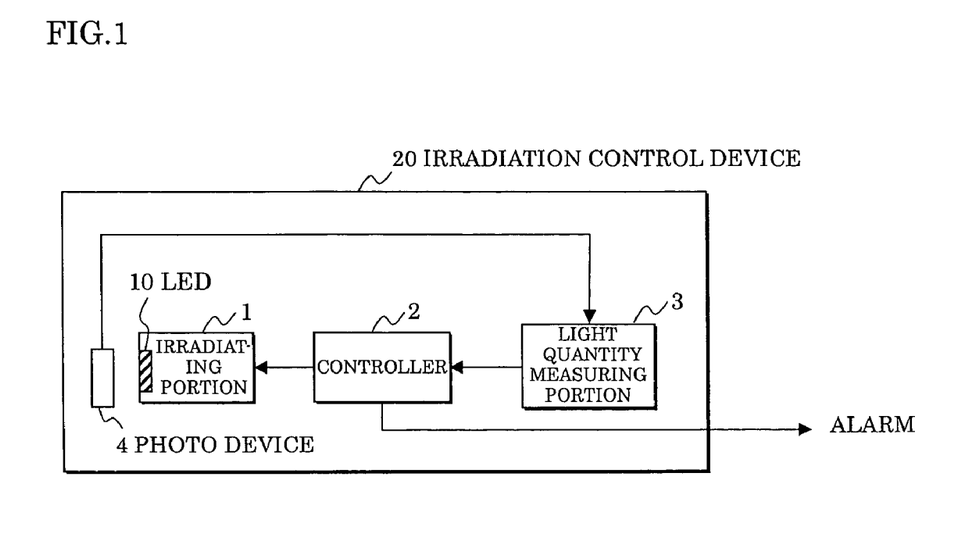
FIG. 1 is a schematic block diagram showing an embodiment (1) of an irradiation control device according to the present invention.

FIG. 1 shows an embodiment (1) of an irradiation control device according to the present invention. An irradiation control device 20 is composed of an irradiating portion 1 having an LED 10, a controller 2 controlling the irradiating portion 1, a light quantity measuring portion 3 providing a light quantity measured to the controller 2, and a photo device 4 such as a photo diode which is provided to the front of the LED 10, receives the output light of the LED 10, and provides the output signal to the light quantity measuring portion 3.

Figure 2:
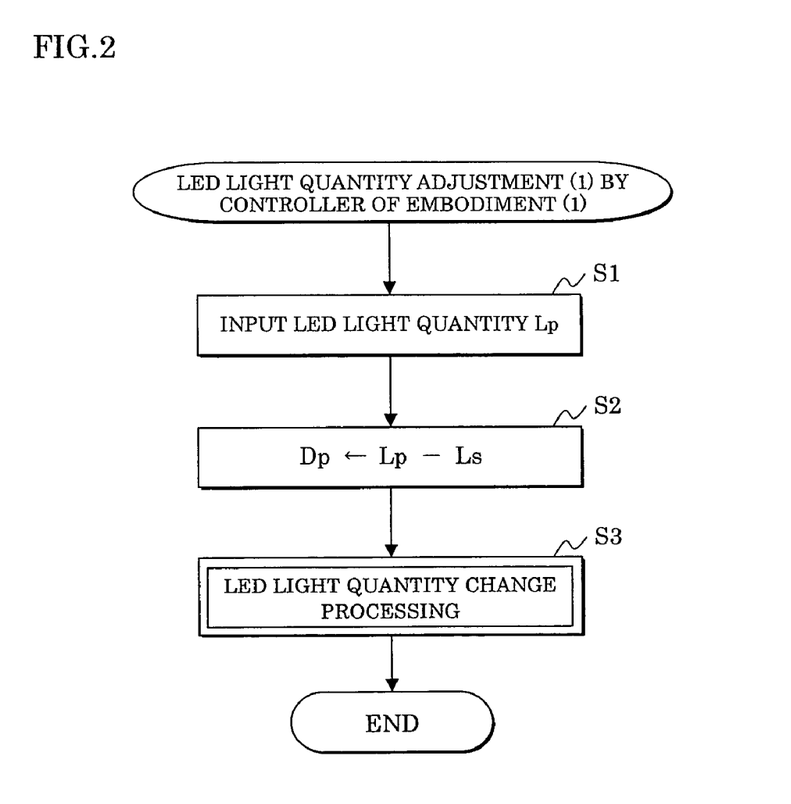
FIG. 2 is a flowchart showing an LED light quantity adjustment operation (1) by a controller of an embodiment (1) of an irradiation control device according to the present invention.

FIG. 2 schematically shows a light quantity adjustment operation (1) for the LED 10 by the controller 2 in the embodiment (1) of the irradiation control device 20 according to the present invention shown in FIG. 1.

Namely, the controller 2 receives as an input an emitted light quantity Lp of the LED 10 measured by the light quantity measuring portion 3 from the output signal of the photo device 4 (at step S1 of FIG. 2). The difference between the light quantity Lp and a threshold Ls corresponding to the predetermined minimum light quantity OM1 required for recognizing a subject is obtained and made Dp (at step S2). Then, based on the difference Dp, the light quantity change processing of the LED 10 is executed (at step S3).

Figure 3:
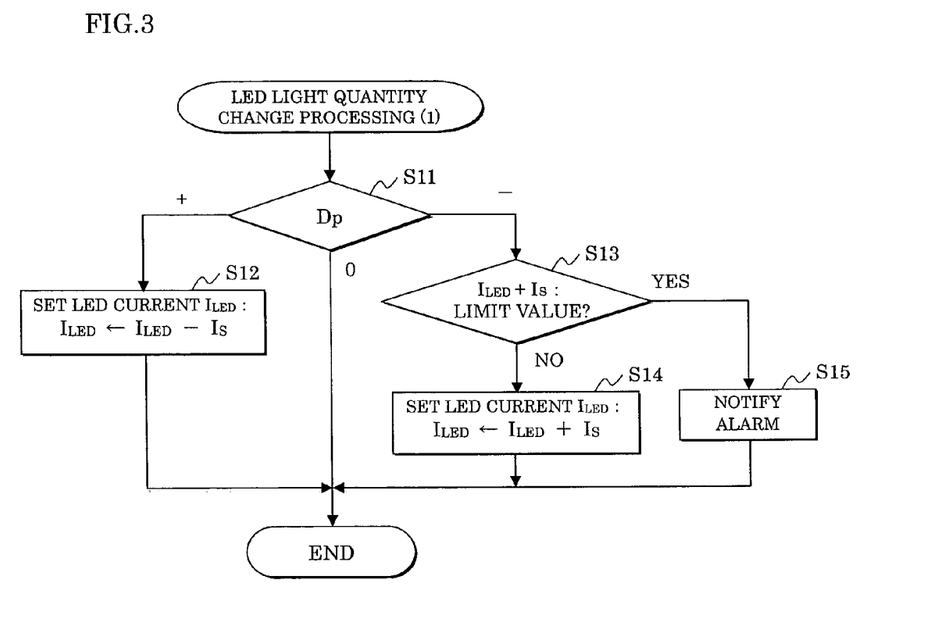
FIG. 3 is a flowchart showing an operation of light quantity change processing (1) of an LED executed in each embodiment of an irradiation control device according to the present invention.
Figure 4:
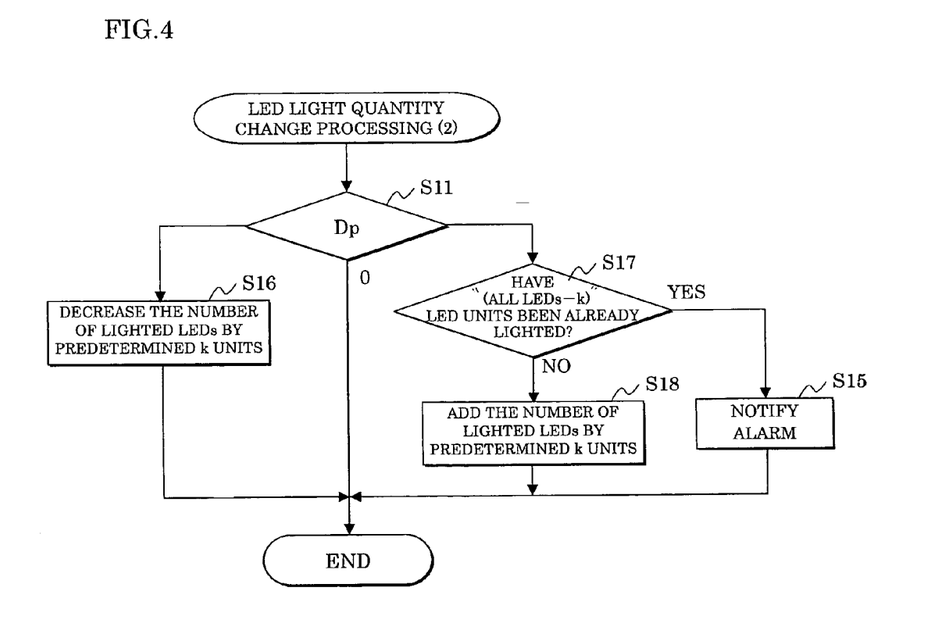
FIG. 4 is a flowchart showing an operation of light quantity change processing (2) of an LED executed in each embodiment of an irradiation control device according to the present invention.

FIGS. 3 and 4 show specific examples of the light quantity change processing of the LED 10 shown at step S3 of FIG. 2.

Firstly, in the light quantity change processing (1) of the LED shown in FIG. 3, whether the difference Dp obtained at step S2 of FIG. 2 is "positive", "negative" or "0" is determined (at step S11 of FIG. 3). If the result is Dp=0, the light quantity of the LED 10 is appropriate, so that the process is finished without performing anything. If Dp is positive, the output light of the LED 10 is too bright. Therefore, in order to darken the light, an operating current $I_{LED}$ of the LED 10 is decreased by a fixed value Is (at step S12).

Also, when Dp is negative, whether or not the operating current $I_{LED}$ can be increased is firstly checked (at step S13).

Namely, whether or not the value at the time when the present operating current value $I_{LED}$ is increased by the predetermined value Is reaches the limit value as the operating current of the LED is determined.

As a result, if it does not reach the current limit value, i.e. the light quantity of the LED 10 can be increased, the operating current value $I_{LED}$ is increased by the predetermined value Is (at step S14). If the light quantity can not be increased, it indicates that the LED 10 can not be brightened any more, and it is determined that the LED 10 has reached the longevity so that an alarm notification is performed (at step S15).

While the operating current value of the LED 10 is controlled in the light quantity change processing (1) of FIG. 3, the number of lighted LEDs 10 is controlled in the light quantity change processing (2) of the LED shown in FIG. 4.

Namely, when the LED 10 shown in FIG. 1 is composed of a plurality of LEDs, the number of lighted LEDs 10 is decreased by predetermined k (k is a positive integer equal to or more than 1) units and the light quantity of the LED 10 is decreased if Dp is also positive after step S11 in FIG. 4 in the same way as step S11 shown in FIG. 3.

Also, when Dp is negative, whether or not "(all LEDs−k)" units have been already lighted is determined (at step S17). When k units can be further lighted, the number of lighted LEDs 10 is added by k units (at step S18). If not the case, it is indicated that the light quantity of the LED 10 can not be increased so that the LED has reached its longevity, at which the alarm notification is performed in the same way as in the case of FIG. 3 (at step S15).

Embodiment 2

Figure 5:
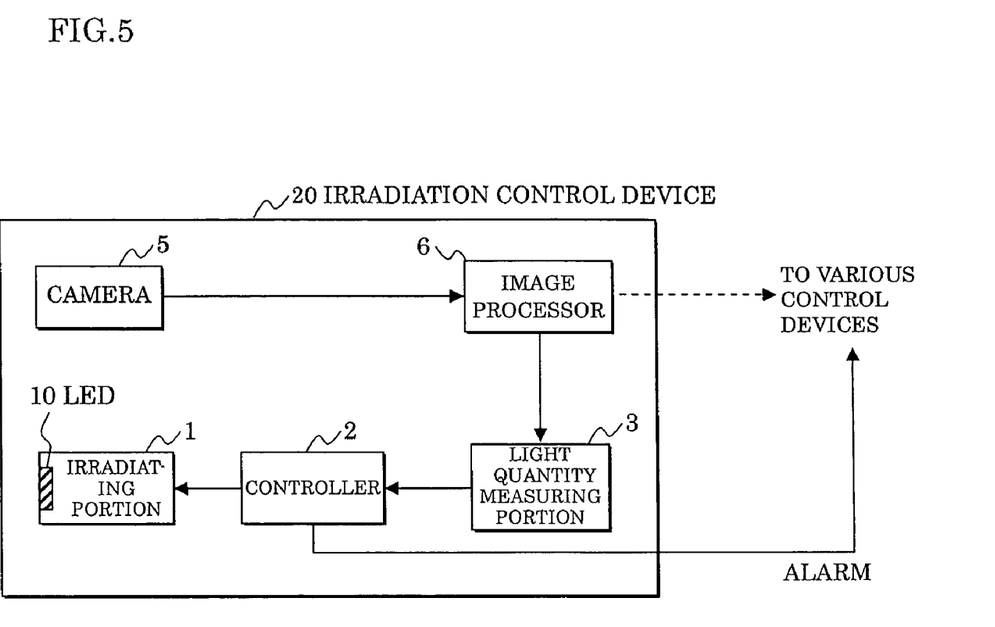
FIG. 5 is a schematic block diagram showing an embodiment (2) of an irradiation control device according to the present invention.

FIG. 5 shows an embodiment (2) of the irradiation control device according to the present invention. This embodiment (2) is different from the embodiment (1) in that the irradiation control device 20 is provided with a camera 5 taking an image of a subject irradiated by the LED 10 and an image processor 6 performing the image processing to the output signal of the camera 5 to be provided to the light quantity measuring portion 3, instead of the photo device 4 provided in relation to the LED 10 as shown in FIG. 1.

Figure 6:
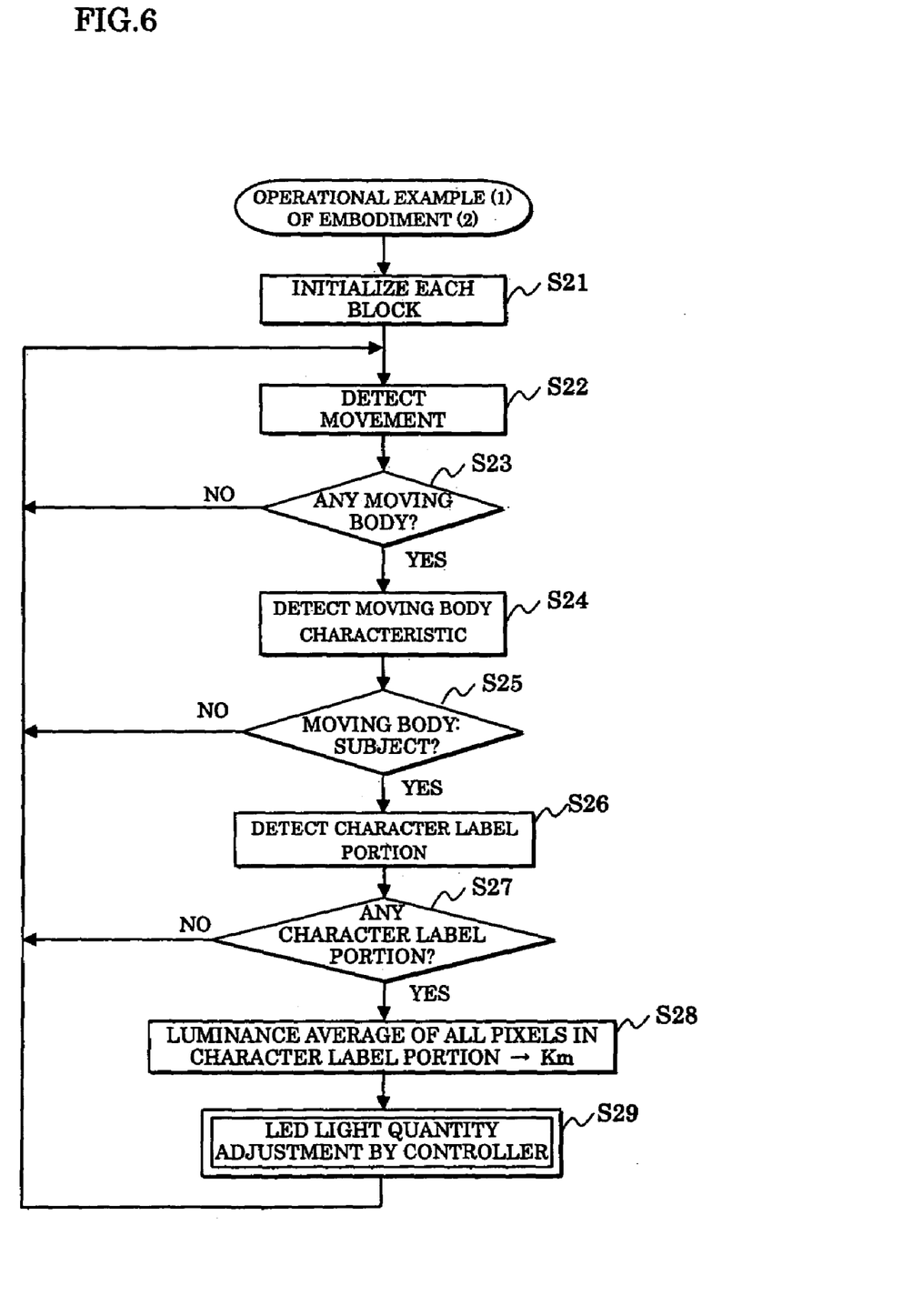
FIG. 6 is a flowchart showing an operation example (1) of an embodiment (2) of an irradiation control device according to the present invention.

FIG. 6 shows an operational example (1) of the embodiment (2) shown in FIG. 5. In this operation example (1), a case of monitoring a package (subject) to which a destination indicating label is affixed and carried on a belt conveyor is mentioned, where a character label portion of the subject is detected, so that the light quantity adjustment of the LED is performed based on its luminance.

When the device is firstly started up (power of the device is turned on), each block is initialized (at step S21 of FIG. 6). Then, the following processings are repeated until the power is turned off.

The image processor 6 tries to detect a moving object (moving body) based on the output image of the camera 5 (at step S22). As a result, in the absence of the moving body, the process returns to step S22, while in the presence of the moving body, the process proceeds to step S24, where the characteristic of the moving body is detected.

Namely, if a package is not determined to be an object in this system from the characteristic of the moving body, the process returns to step S22. If the package is determined to be an object, the process proceeds to step S26, in which the detection of the portion corresponding to the character label portion (destination indicating board) with which the moving body is provided is tried. When the portion is not detected, the process returns to step S22 and the processing is repeated. When the portion is detected, the average of the luminances of all the pixels in the character label portion is calculated and made Km (at step S28).

Figure 7:
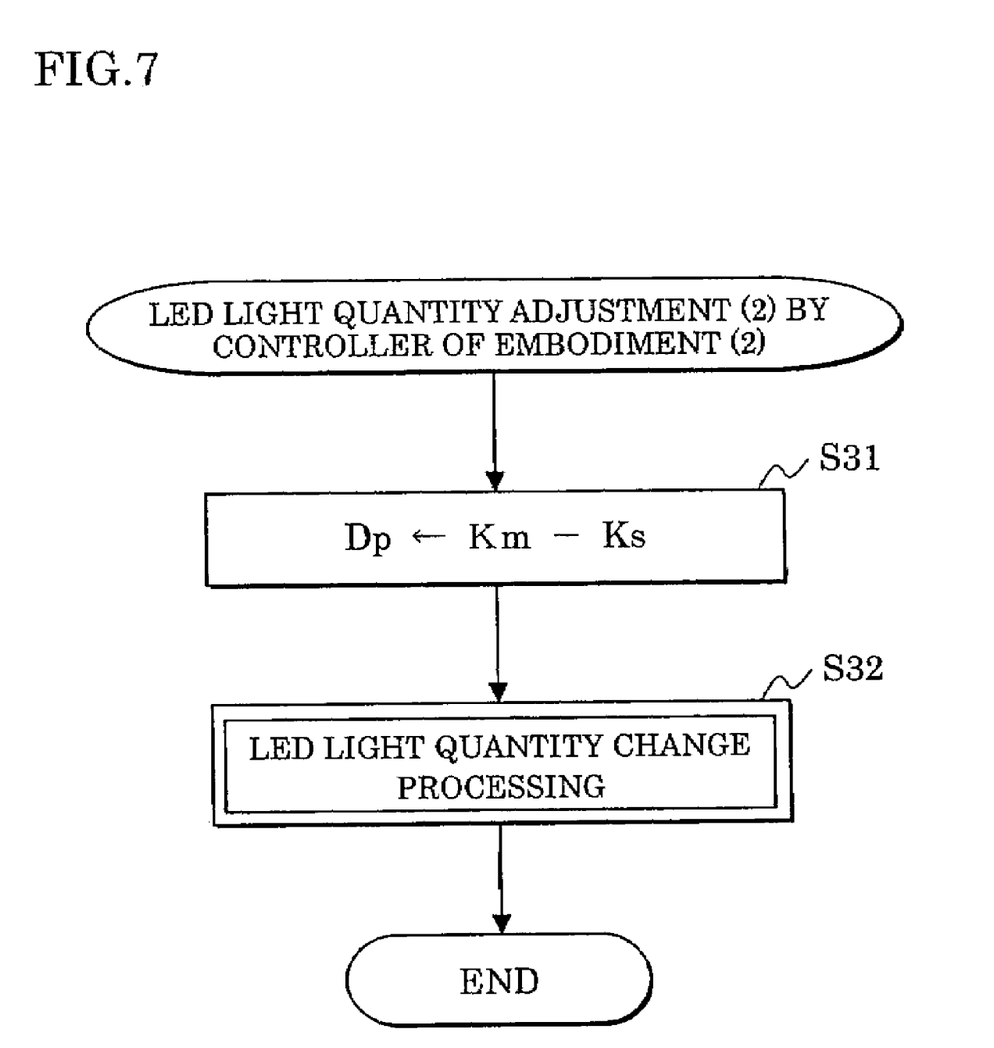
FIG. 7 is a flowchart showing an LED light quantity adjustment operation (2) by a controller in the flowchart shown in FIG. 6.

Based on Km thus obtained, the controller 2 executes the light quantity adjustment of the LED 10 (at step S29). FIG. 7 shows an example of the light quantity adjustment of the LED.

Namely, the controller 2 in FIG. 7 obtains the difference between the average luminance Km obtained at step S28 of FIG. 6 and a threshold Ks corresponding to the minimum light quantity OM1 required for the image processing and the subject recognition shown in FIG. 11 and makes it Dp in the same way as step S2 of FIG. 2 (at step S31 of FIG. 7).

Then, the light quantity change processing of LED is executed (at step S32). For the light quantity change processing, light quantity change processings (1) and (2) respectively shown in FIGS. 3 and 4 may be executed.

Figure 8:
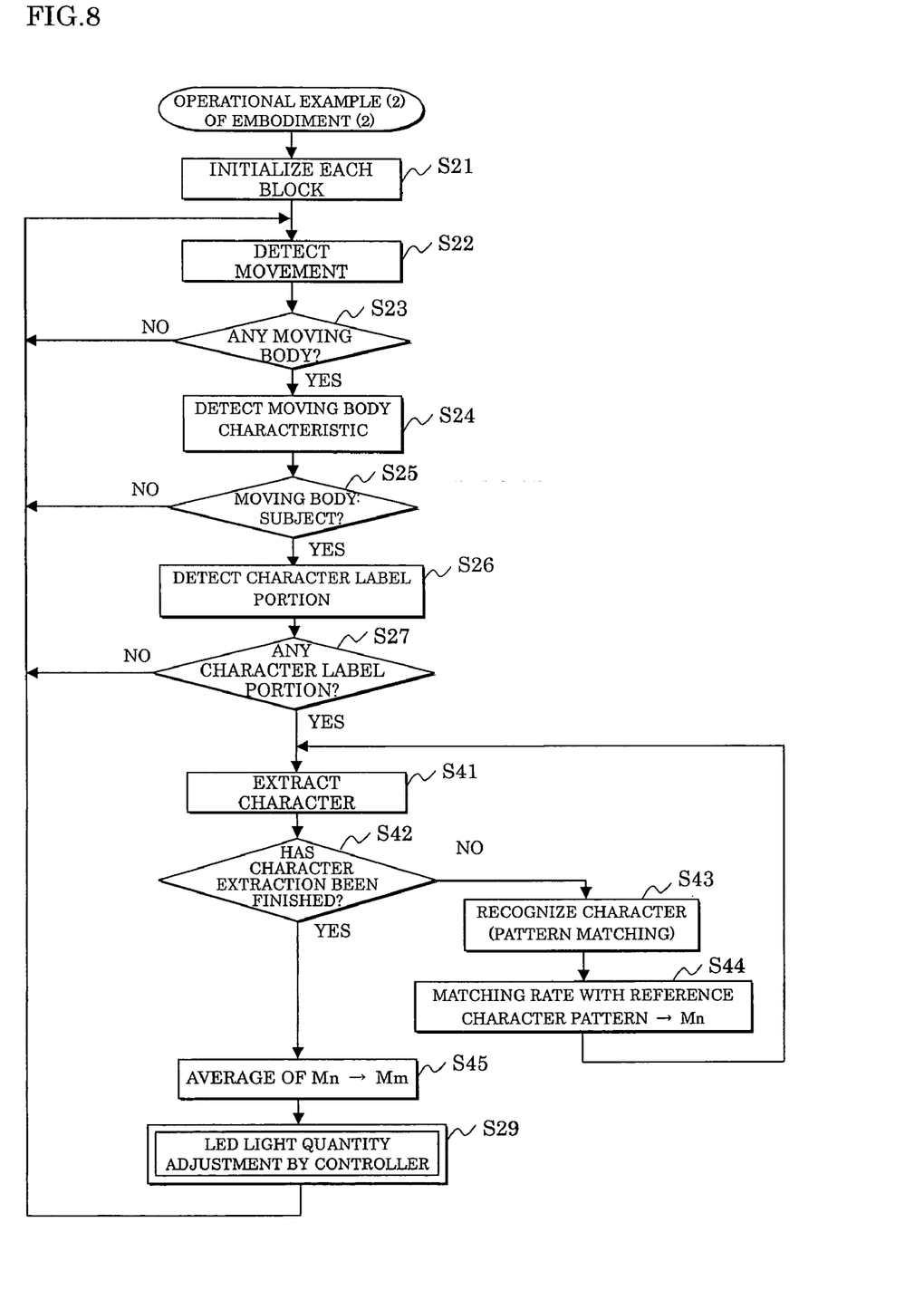
FIG. 8 is a flowchart showing an operation example (2) of an embodiment (2) of an irradiation control device according to the present invention.

FIG. 8 shows an operation example (2) by the embodiment (2) of the irradiation control device 20 according to the present invention shown in FIG. 5.

This operation example (2) is different from the operation example (1) shown in FIG. 6 in that steps S41–S45 as shown in FIG. 8 substitute for step S28 of FIG. 6.

Namely, when the character label portion can be detected at step S27, a character extraction is firstly tried therefrom (at step S41 of FIG. 8). Before the character extraction is finished, the recognition (pattern matching) of the character is firstly executed (at step S43), and a matching rate Mn between the recognized character and the reference character pattern prepared is obtained (at step S44). Such steps S41–S44 are repeated until the character extraction is finished.

When the character extraction is finished, the process proceeds from step S42 to step S45, in which the average value of the matching rate Mn obtained at step S44 is calculated and made Mm (at step S45).

The controller 2 executes the light quantity adjustment of the LED by using the average matching rate Mm thus obtained (at step S29).

Figure 9:
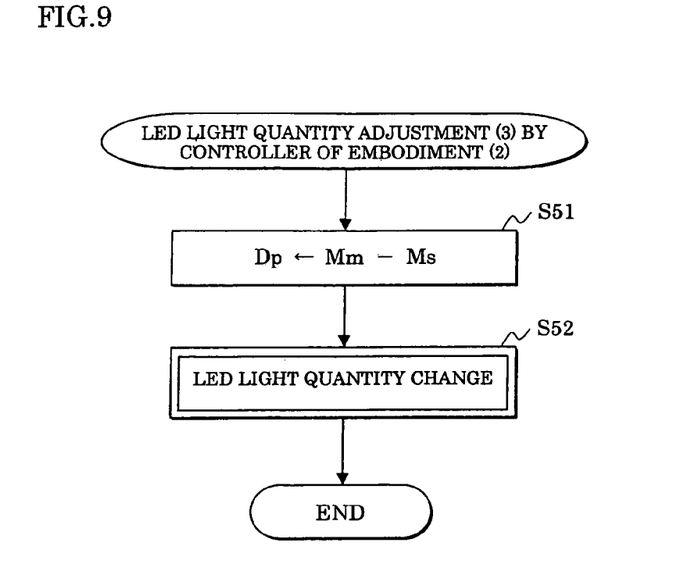
FIG. 9 is a flowchart showing an LED light quantity adjustment operation (3) by a controller in the flowchart shown in FIG. 8.

FIG. 9 shows an operation example in the light quantity adjustment at step S29.

Namely, a threshold Ms corresponding to the minimum light quantity OM1 required for the image processing or the subject recognition shown in FIG. 11 is subtracted from the average value Mm of the matching rate obtained at step S45 and made Dp (at step S51 of FIG. 9).

Based on the difference Dp thus obtained, the light quantity change processing of the LED 10 is executed (at step S52). For the light quantity change processing, the light quantity processings (1) and (2) respectively shown in FIGS. 3 and 4 may be used similarly.

As described above, the irradiation control device according to the present invention is arranged such that a feedback control is performed to an irradiating portion by an output signal of a photo device provided in relation to an LED of the irradiating portion, thereby making brightness fixed. Alternatively, the irradiation control device according to the present invention is arranged such that image processing is performed to an image taken by a camera, brightness on a screen is calculated and a feedback control is performed to the irradiating portion in order to make the brightness fixed. Furthermore, the irradiation control device according to the present invention is arranged such that the feedback control is performed to the irradiating portion based on a recognition rate upon character recognition within the image taken.

Therefore, the LED can be lighted at a minimum fixed light quantity required, thereby enabling the longevity of the LED to be realized.

Also, since the present light quantity of the LED can be directly or indirectly recognized in a process of performing feedback of the light quantity of the LED, an exchange timing of the LED can be recognized.

What is claimed is:

1. An irradiation control device comprising:
    an irradiating portion having an LED;
    a photo device receiving an output light of the LED;
    a light quantity measuring portion measuring a light quantity of the LED from an output signal of the photo device; and
    a controller controlling the irradiating portion based on the measured light quantity, keeping the light quantity of the LED at a predetermined minimum fixed level required for recognizing a subject irradiated by the irradiating portion.

2. The irradiation control device as claimed in claim 1, wherein the controller controls an operating current value of the LED.

3. The irradiation control device as claimed in claim 2, wherein the controller performs an alarm notification when the operating current value is increased to reach a current limit value thereof.

4. The irradiation control device as claimed in claim 1, wherein the irradiating portion has a plurality of LEDs and the controller controls a number of LEDs lighted to achieve the fixed level.

5. The irradiation control device as claimed in claim 4, wherein the controller performs an alarm notification when determining that the fixed level can not be achieved even by increasing the number of LEDs lighted.

6. An irradiation control device comprising:
    an irradiating portion having an LED;
    a camera taking an image of a subject irradiated by the irradiating portion;
    an image processor processing an output image from the camera and detecting luminance of the subject; and
    a controller controlling the irradiating portion based on the detected luminance, keeping the luminance of the subject at a predetermined minimum fixed level required for recognizing image of the subject.

7. The irradiation control device as claimed in claim 6, wherein the image processor detects a character label portion of the subject, thereby detecting luminance thereof.

8. The irradiation control device as claimed in claim 6, wherein the controller controls an operating current value of the LED.

9. The irradiation control device as claimed in claim 6, wherein the irradiating portion has a plurality of LEDs and the controller controls a number of LEDs lighted to achieve the fixed level.

10. An irradiation control device comprising:
    an irradiating portion having an LED;
    a camera taking an image of a subject irradiated by the irradiating portion;
    an image processor performing a character recognition of the character label portion and detecting a matching rate with a reference character pattern; and
    a controller controlling the irradiating portion based on the detected matching rate, keeping the matching rate at a predetermined minimum fixed level required for an image recognition of the subject.

11. The irradiation control device as claimed in claim 10, wherein the controller controls an operating current value of the LED.

12. The irradiation control device as claimed in claim 10, wherein the irradiating portion has a plurality of LEDs and the controller controls a number of LEDs lighted to achieve the fixed level.

* * * * *